United States Patent [19]

Barbe

[11] 4,411,405

[45] Oct. 25, 1983

[54] BUTTERFLY-VALVE

[75] Inventor: Pierre L. C. C. Barbe, Toul, France

[73] Assignee: Pont-A-Mousson S.A., Nancy, France

[21] Appl. No.: 279,142

[22] Filed: Jun. 30, 1981

[30] Foreign Application Priority Data

Jul. 18, 1980 [FR] France .............. 80 15925

[51] Int. Cl.³ .............................................. F16K 1/22
[52] U.S. Cl. ................................................. 251/306
[58] Field of Search ................. 251/305, 306, 298; 137/527.8

[56] References Cited

U.S. PATENT DOCUMENTS

| | | | |
|---|---|---|---|
| 2,278,421 | 4/1942 | Brown | 251/305 X |
| 2,980,388 | 4/1961 | White | 251/298 |
| 3,078,069 | 2/1963 | Broadbent | 251/305 |
| 3,448,465 | 6/1969 | Pierce et al. | 137/527.8 |
| 3,680,833 | 8/1972 | McNeely, Jr. | 251/305 X |
| 4,154,426 | 5/1979 | Santy et al. | 251/306 X |

Primary Examiner—Martin P. Schwadron
Assistant Examiner—Sheri Novack
Attorney, Agent, or Firm—Sughrue, Mion, Zinn, Macpeak and Seas

[57] ABSTRACT

A butterfly valve comprises a closure member 8 having a warped curve periphery pivotably disposed within a tubular body 1. An elastic seal and a cooperating seat are provided on the closure member and tubular body, respectively, or vice versa. At each point of a mean line of seat, a plane T tangent to the seat forms a roughly constant acute angle x of 20° to 30° with a tangent t to the path of the corresponding point of the closure member at the point of contact of the seal and seat.

23 Claims, 18 Drawing Figures

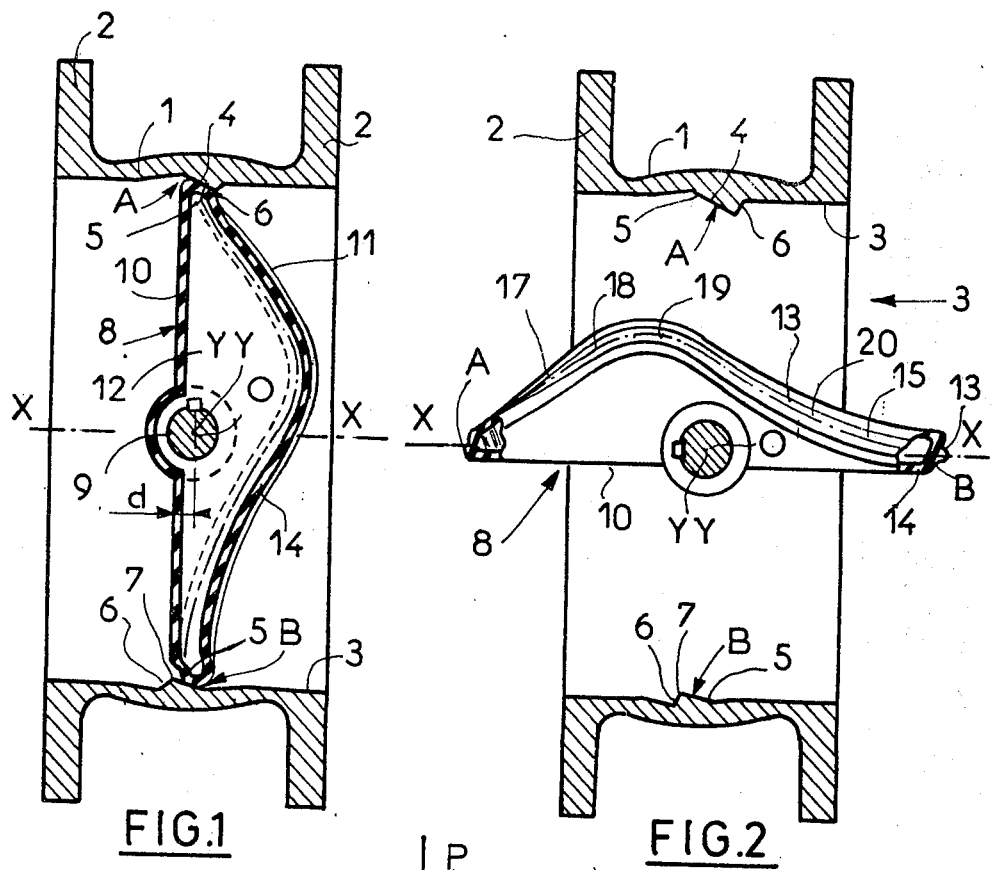
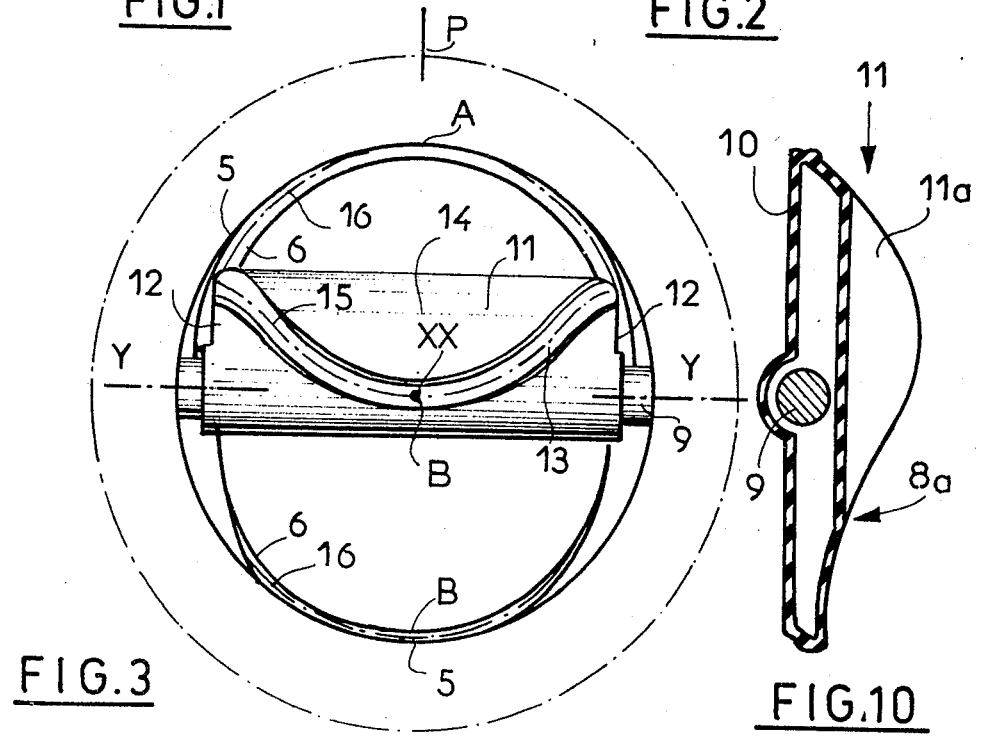

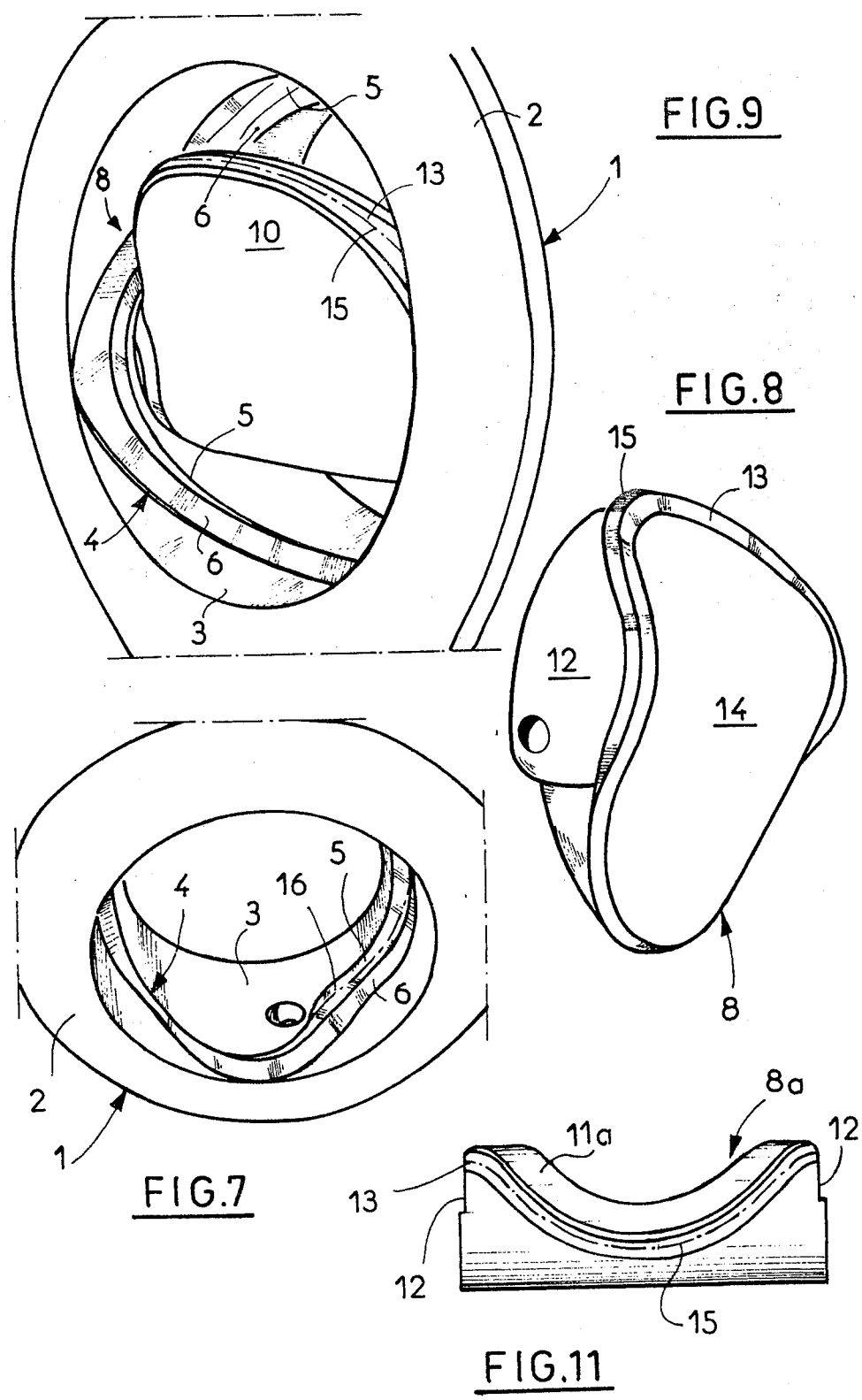

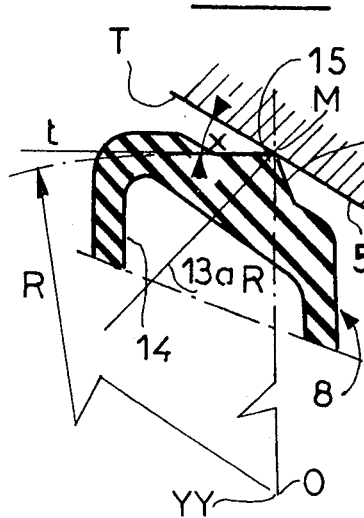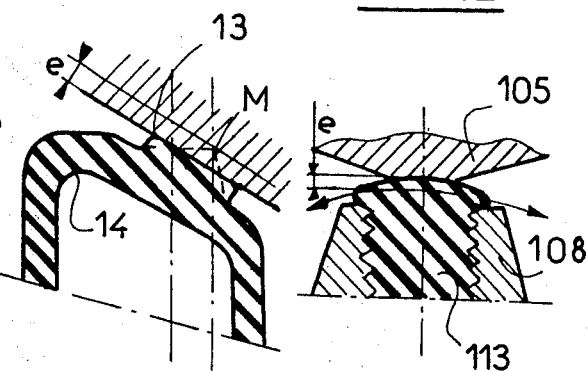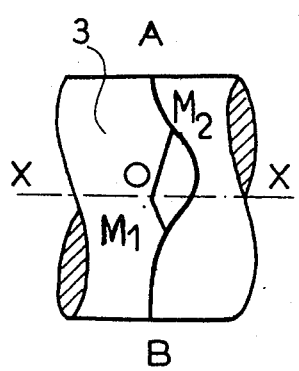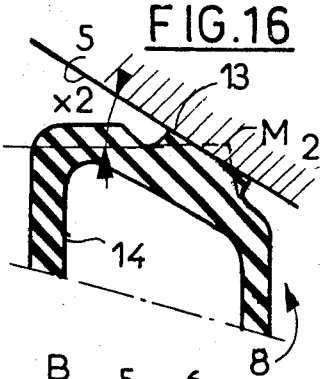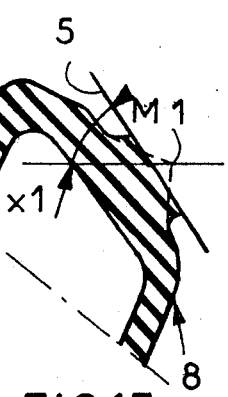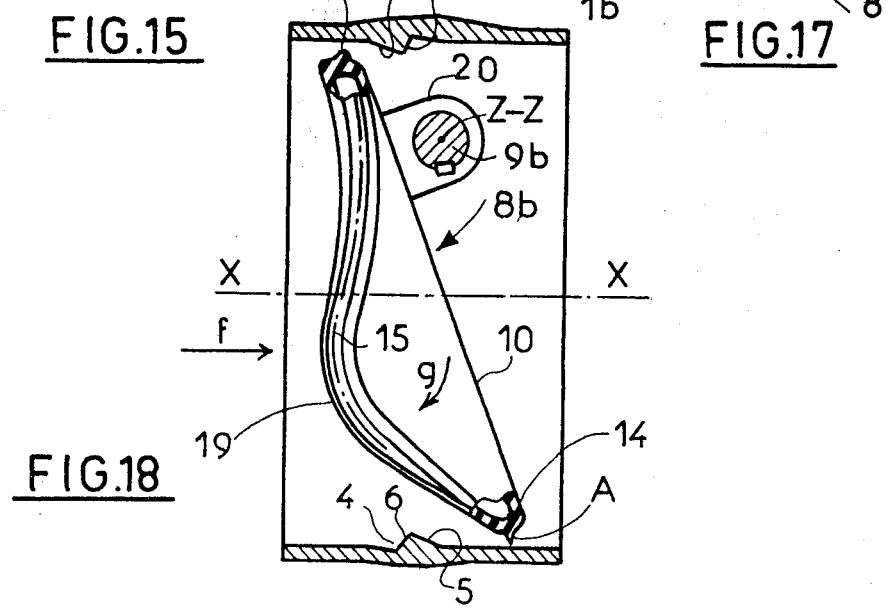

BUTTERFLY-VALVE

DESCRIPTION

The present invention relates to a butterfly-valve of the type comprising a tubular body which defines a flow passage and a butterfly closure member mounted in said body to rotate about an axis perpendicular to the axis of the passage, one of the two elements carrying an elastically yieldable seal element and the other a seat surface for said element, the latter defining a seal line identical to the mean line of the seat surface, apart from the crushing of the seal element.

In these valves, the seal element may be disposed either in the body or on the butterfly closure member. Further, the axis of rotation of the butterfly member may either intersect the flow axis (centered butterfly member) or not intersect the flow axis (eccentric butterfly member). The invention is applicable to controlled butterfly valves and to butterfly valves constituting check-valves.

The problem of the sealing of a butterfly-valve resides in the obtainment of a good peripheral contact between the seal element and the seat in the closing position and in particular in the diametral zone close to the axis of rotation. This problem is usually solved (see, for example, French Pat. No. 1 543 451) by providing a substantial interference between the seat and the seal element i.e. a relatively large radial projection of the seal element relative to the surface of the seat.

However, this interference results in considerable friction in the neighbourhood of the closing position and therefore in high operating torque and high power for rotating the butterfly member in addition to great wear of the seal element.

Owing to these drawbacks, the Applicant has tackled the problem of avoiding the necessity of any predetermined projection or interference of the seal element relative to the surface of the seat against which it must be applied.

The invention accordingly provides a butterfly-valve of the aforementioned type, wherein at each point of the mean line of the seat, the plane tangent to the seat makes an at least roughly constant acute angle with the tangent to the path of the corresponding point of the butterfly member at the point of contact of the seal element with the seat.

With this arrangement, a seal is ensured throughout the periphery of the butterfly member by a simple gradual compression or crushing of the seal element. As soon as the considered angle has a sufficient value, the seal element approaches or encounters the seat with no sliding or friction, even in the diametral zone in the neighbourhood of the axis of rotation.

In this way, not only the wear and the operating torque are reduced, but the seat may be as cast, it being understood that the "as cast" expression does not mean that the surface is rough since present casting means in the foundry enable fine surface conditions to be produced, for example by the use of fine-particle sands bound by commercially-available synthetic binders.

The considered angle, which is preferably of the order of 20° to 30°, may either be exactly constant throughout the periphery of the butterfly member and seat so as to facilitate manufacture, or vary along this periphery as an inverse ratio of the radius of displacement of the point moving along the seal line so as to render the crushing of the seal element uniform in all positions of closure of the butterfly member, even before the position corresponding to maximum closure is reached.

In one embodiment of the invention, said mean line defined on the body has, in section in a plane containing the axis of the flow passage and perpendicular to the axis of rotation of the butterfly member, this plane being a plane of symmetry of the valve, a semi-amphora shape comprising, on one side of the flow axis, starting at its end, a roughly rectilinear inclined portion corresponding to the foot of the amphora and connected to a swell whose apex is rounded and convex and located outside the flow axis, and, on the other side of said axis, a concave portion corresponding to the neck of the amphora.

Further features and advantages of the invention will be apparent from the ensuing description which is given by way of a non limitative example with reference to the accompanying drawings in which:

FIG. 1 is a longitudinal sectional view of a butterfly-valve according to the invention in the closed position of the valve;

FIG. 2 is a view similar to FIG. 1 of the butterfly-valve in the open position thereof;

FIG. 3 is a cross-sectional view of the seat and butterfly member in the open position, in the direction of arrow 3 of FIG. 2;

FIGS. 7, 8 and 9 are simplified perspective views respectively showing the surface of the seat along, the butterfly member alone and the assembly of the butterfly member and seat in the partly opened position of the valve;

FIG. 10 is a sectional view of a modification of the butterfly member of FIG. 1;

FIG. 11 is a view in the direction of arrow 11 of the butterfly member of FIG. 10;

FIG. 12 is a partial view, to an enlarged scale, illustrating the interference between a seal element of a butterfly member and its seat in a valve of the prior art;

FIGS. 13 and 14 are similar detail views illustrating the compression of the seal element on the seat of the valve according to the invention, FIG. 13 showing the seal element in the free state at the moment of contact thereof with the seat and FIG. 14 showing the seal element in the compressed state in the completely closed position of the valve;

FIG. 15 is a geometric diagram similar to FIGS. 5 and 6 showing two radii of unequal lengths between the seal line and the axis of rotation of the butterfly member;

FIGS. 16 and 17 are views similar to FIG. 14 illustrating, in an exaggerated manner, a modification of the seat surface with a modification of the angle between the two radii of FIG. 15, and FIG. 18 is a view similar to FIG. 1 of a modification of a butterfly-valve according to the invention, this valve being of the eccentric type and of utility as a check-valve.

Figure 4:
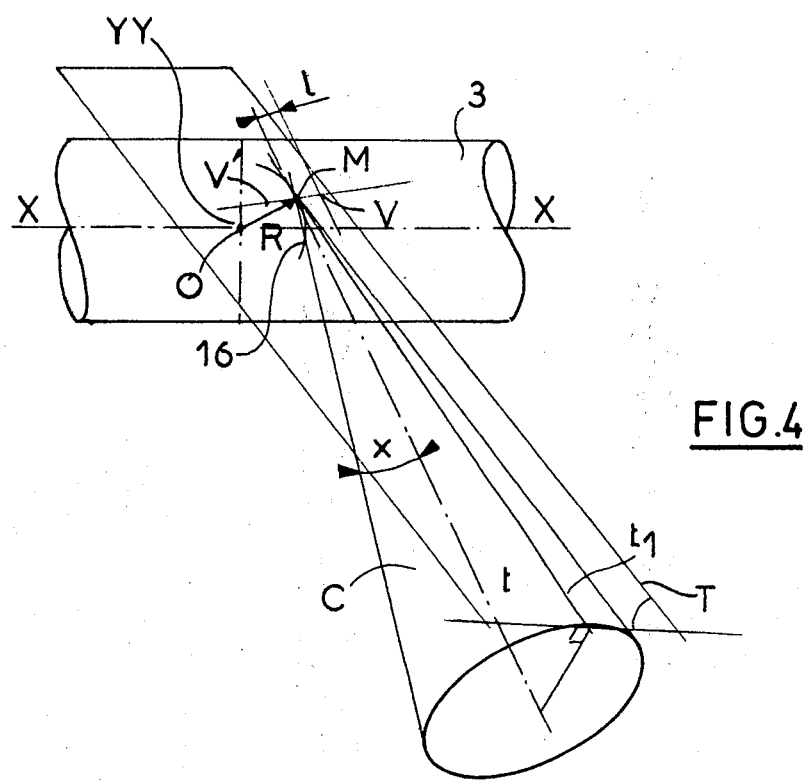
FIG. 4 is a geometric diagram illustrating the geometric definition of the seal line between the seal element and its seat and that of the seal surface.

In the embodiment shown in FIGS. 1 to 3 and 7 to 9, the invention is applied to a controlled butterfly-valve whose tubular body 1, having an axis X—X assumed to be horizontal, is provided with flanges 2 for connection to piping in which the valve is to be mounted, these flanges 2 being optional. This valve is applicable to water, petroleum or other liquid pipes and to pipes conveying gaseous fluids or powdered solid products.

The body 1 has, mid-way of its length, and projecting inside the cylindrical flow cavity or passage 3 of circular section, a seat 4 comprising two sides 5 and 6 of unequal slopes which are irregular surfaces having a continuous evolution about the axis X—X and intersecting along an edge 7 which forms a closed irregular or warped loop about said axis X—X. The side 5 having the smaller slope constitutes the seat proper of the valve. The body is in the as-cast state, but the seat has nonetheless a fine surface condition owing to the use of a modern precision moulding process in foundry work.

The rotary closure member or butterfly member 8 is of the "centered" type, i.e. it is keyed on a rotary shaft 9 whose axis Y—Y is perpendicular to the axis X—X and is also assumed to be horizontal and intersects the axis X—X at O. The shaft 9 is connected to means for driving it in rotation in both directions (not shown). The butterfly member 8 comprises a planar surface 10 which has a bulging portion alongside the axis Y—Y in the form of a cylindrical sector receiving the shaft 9, a convex curved surface 11 connected to the surface 10 at the two ends of the latter the most remote from the axis Y—Y, and two lateral convex curved surfaces 12 which close the volume of the butterfly member and through which the shaft 9 extends.

In this embodiment, the axis Y—Y is offset in that it is not contained in the plane of the surface 10 of the butterfly member but offset a small distance d relative to said plane toward the opposed surface 11.

The whole of the periphery of the curved surface 11 is surrounded by a seal bead or element 13 of elastomer adapted to be sealingly applied against the seat 5. In this embodiment, the seal element 13 is a projection on a covering 14 of elastomer which covers the whole of the butterfly member 8. This projection has a curved and sinuous or warped closed contour or configuration and has a small width across a crest or seal line 15. The cross-sectional shape of the bead 13 is triangular, the line 15 constituting the apex of this triangle. The mean line 16 constituting the seal line of the seat 5 is identical to the line 15, apart from the crushing of the elastomer, as will be understood hereinafter.

In the closed position of the valve, the seat 4 and the butterfly member 8 have as a common plane of symmetry the plane P (FIG. 3) perpendicular to the axis of rotation Y—Y and containing the flow axis X—X.

When the seal element of the closure member is in a position in which it has just encountered the seat 5 without crushing of the seal element and the line 16 is coincident with the seal line 15, at every point M of the seal line 16, i.e. throughout the periphery of the flow passage the plane T tangent to the seal surface or seat 5 makes an acute angle x with the tangent t to the circle which has a radius R, has its centre on axis Y—Y and passes through the point M (FIGS. 4 and 13, this acute angle being constant or roughly constant throughout said periphery). This condition is satisfied even in the end regions in the neighbourhood of the axis Y—Y whose trace is shown at O.

In order to define the seal line 16, reference will be made to FIG. 4 which diagrammatically represents the cylindrical flow passage 3, and the line 16 will be assumed to be traced on this cylinder.

Starting at any point M on the passage 3, the tangent Mt to the circle of axis Y—Y passing through M is drawn. The desired tangent plane makes a given angle x with the straight line Mt; it concerns therefore a plane T tangent to the cone C of axis Mt and having a semi-apex angle x, and the desired tangent $Mt^1$ belongs to this plane. For reasons of overall size of the butterfly member in the direction perpendicular to the axis Y—Y, there is chosen for a given plane T, the straight line $Mt^1$ constituted by the generatrix of the cone C in this plane.

In order to define the plane T, it will be observed that the tangent $Mt^1$ also belongs to the plane tangent to the passage 3 at M. This tangent is consequently finally constituted by the intersection (or by one of the intersections) between this tangent plane and the cone C.

By repeating this construction point by point, and bearing in mind the required continuity, the Applicant has adopted for the lines 15 and 16 the semi-amphora profile shown in FIGS. 1 and 2. Starting at an extreme point A the most remote from the axis Y—Y in the closed position of the valve, and constituting the foot of the amphora, this point being the uppermost in FIG. 1, this profile comprises in succession a roughly rectilinear or slightly concave portion 17 which obliquely extends away from the planar surface 10 (FIG. 2) a convex curved portion or swell 18 whose rounded apex is in the vicinity of the axis X—X but located before the latter, and then a concave portion 20 which extends roughly from the axis X—X to another extreme point B the most remote from the axis Y—Y.

Figure 5:
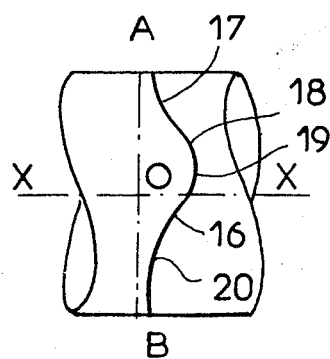
FIGS. 5 and 6 are diagrams similar to FIG. 4 showing two modifications of seal lines.
Figure 6:
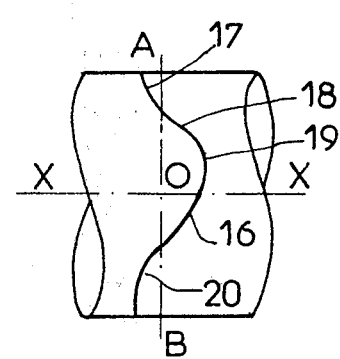

Thus, the line 15 is entirely located on a single side of the surface 10. The points A and B may be either in alignment with the point O as in FIGS. 1 and 2, or, by way of a modification, offset in either direction parallel to the axis X—X as shown in FIGS. 5 and 6. The chosen arrangement is that which results in a minimum axial overall size, which is to be considered in each particular case.

When viewed in a perpendicular direction, i.e. along the axis X—X, for the seal line 15 when the butterfly member is in its fully open position, this seal line has the shape of a trough with two points of inflection close to its ends as seen in FIG. 3.

The point of departure M of the curve 16 relative to the axis Y—Y is so chosen that this curve 16 is as advantageous as possible. This choice must result in a swell 18 whose convex rounded apex 19 is located as close as possible to the axis Y—Y while however leaving the passage required for the control shaft 9. For example, it would not be rational to choose a point M which is excessively remote from the axis Y—Y, which would require the local recessing of the inner wall of the cavity or passage 3 to allow the passage of the radius OM of the butterfly member 8 when the latter moves.

It has been seen above that the plane T tangent to the surface of the seat 5 at the point M is defined at the same time as the tangent $Mt^1$ to the seal line 16. The surface 5 is a ruled surface, i.e. a surface generated by a rectilinear generator, forming the envelope of all the tangent planes T along the line 16. To obtain the generatrix at the point M, there is drawn in the tangent plane T a short segment of a straight line MV, MV' perpendicular to the straight line $Mt^1$ and of length 1 on each side of the point M. The surface 5 has a sinuous evolution about the axis X—X, and faces one end of the body 1 at point A located on one side of the plane defined by the axes X—X and Y—Y and faces the other end of the body 1 at the opposite point B. The inclination of the axis of symmetry 13a of the section of the seal bead 13 of the butterfly member with respect to this plane has a similar evolution so that, at each point of the seal line, this bead faces the seat 5 at the end of the closure of the butterfly member in the manner shown in FIG. 13.

The manner in which the seal element 13 operates is shown in FIGS. 13 and 14. At each point, this element encounters the seat 5 by its apex M (FIG. 13) and, in continuing to rotate the butterfly member, a pure compression of the seal element occurs with deformation of the elastomer but with no sliding or friction (FIG. 14). This should be compared with the seal element 113 shown in FIG. 12 which pertains to a known butterfly-valve disclosed in French Pat. No. 1 543 451. The seal element 113 of the butterfly member 108 has an interference or overlapping e with the seat 105 and encounters the latter laterally so that, when closing or opening the valve, its compression is accompanied by considerable friction which results in rapid wear.

The angle x made by the plane T tangent to the surface of the seat at a point M and by the tangent t at the point M to the circle of radius OM is chosen in accordance with the optimum crushing of the seal element 13 of elastomer against the seat 5. Optimum crushing e is intended to mean that which is necessary and sufficient throughout the periphery of the butterfly member and of the seat surface to ensure a seal in the closed position of the butterfly member for a given operating pressure. For a given nominal diameter of the flow passage 3, the crushing e required to achieve the seal is greater for a higher operating pressure than for a lower operating pressure. The force or torque for closing the butterfly member is related to the crushing e. This torque is greater for a greater crushing e than for a smaller crushing e. Thus the optimum crushing e is that which requires a closing torque just sufficient to ensure the seal.

An angle x which is exactly constant throughout the periphery of the butterfly member and seat surface may be chosen so as to permit a more easy construction. The angle x may also be made to vary along the periphery of the butterfly member and seat surface. In both cases, the crushing e of the seal element 13 of elastomer against the seat 5 is constant throughout the periphery of the seat in the closed position of the butterfly member. However, in the first case, the crushing e is only constant in the fully closed position and varies throughout the periphery between the position corresponding to the beginning of the contact of the seal element with the seat surface and the final closed position of the butterfly member. On the other hand, in the second case, a constant crushing can be obtained throughout the periphery as soon as the seal element contacts the seat up to the fully closed position of the butterfly member.

More precisely, if a constant angle x is chosen, in the course of the rotation of the butterfly member 8 to its closing position, the contact of the seal element 13 with the seat and its crushing start at points of the seal line 15 which are the closest to the axis of rotation Y—Y and then progressively travel along the whole of the periphery. Consequently, the value e of the crushing of the seal element varies throughout the periphery up to the fully closed position in which the value e becomes constant throughout the periphery. If the force for urging the butterfly member in the direction for closing the valve and compressing the seal element is desired to be reduced, i.e. if it is desired not to reach the fully closed position, it must be ensured that, in the parts of the periphery where the crushing e has the lowest value, this value is sufficient to ensure the seal bearing in mind the considered pressure.

The angle x can, on the other hand, be varied in the inverse ratio of the radius OM throughout the periphery of the butterfly member, i.e. in the inverse ratio to the distance between each point M of the seal line 15 and the centre point O of the axis Y—Y of rotation. Bearing in mind the shape of the seal line 15 in the shape of a semi-amphora, the radius $OM^1$ is minimum in the vicinity of the axis of rotation Y—Y and consequently the angle $x^1$ is maximum in this zone (FIG. 17), while the radius $OM^2$ is maximum at the ends of the diameter AB and consequently the angle $x^2$ is minimum at these ends (FIG. 16). It is thus possible to obtain a simultaneous encounter of all the points of the crest of the seal element 13 with the seat surface 5 and, upon this encounter, a uniform value of the crushing of the seal element throughout the periphery of the butterfly member and seat surface, this crushing increasing gradually with increase in the tightening of the butterfly member against the seat, i.e. as the butterfly member rotates toward the closing position, but remaining uniform throughout the periphery in the course of this tightening or rotation. The advantage of this is that, when the butterfly member is not rotated to the fully closed position, the seal is achieved with certainty throughout the periphery as soon as the crushing is sufficient at a point, bearing in mind the operating pressure. Thus it is possible to decrease the tightening force for a given pressure. But, on the other hand, the seal line of the seat surface is much more difficult to obtain and the overall axial size is larger since the amphora has a "fatter" swell.

In practice, a constant angle x of the order of 20° to 30° may be adopted with allowance of variations of a few degrees more or less at certain points of the seal line 15 so as to smooth out the variations or the evolution of the curvature of the seat surface 5.

Geometrically, this amounts to admitting that a tangent $Mt^1$ (FIG. 4) is not always exactly located on the cone C but may be located in the vicinity of this cone. In other words, the minimum overall size of the butterfly member 8 is sometimes renounced in the interest of greater safety in the seal achieved by an improved uniformity of the crushing e throughout the periphery. Note in this respect that, in accordance with the choice of the angle x (exactly constant throughout the periphery of the butterfly member and seat or allowing slight variations), the prominence of the swell of the semi-amphora profile may be more or less accentuated.

In a practical embodiment which has given satisfaction, the seat 4 and the butterfly member 8 thus geometrically defined are constructed in the following manner.

The seat 4 (FIGS. 1, 3, 7 and 9) projects inwardly from the passage 3 and is located on each side of the plane of symmetry P. The seat surface 5 is a sinuous surface located on each side of the seal line 15 having a semi-amphora shape. By a more or less progressive twisting below the axis Y—Y on each side of the plane of symmetry P, the seat surface 5 changes orientation from the point A to the point B in order to obliquely face the direction of flow if it was oriented in the opposite direction, or vice-versa. On the other hand, at the two ends of the axis Y—Y, the surface 5 has the same orientation relative to the direction of flow and this orientation is the same up to the point A located adjacent the butterfly member in the open position of the latter (FIG. 3). The surface 5 remains inclined at a constant or roughly constant angle, even in the zone of the axis Y—Y of rotation, relative to the tangent at any point M of the seal line 15 to the circle of radius OM which is the path that the point M travels through when the butterfly member 8 is rotated. This angle is of the order of 20° to 30°. Said seal surface 5 passes around the cavity of the rotary shaft 9 having the axis Y—Y and is located on a single side of the latter, and the same is true of the seal element 13 of the butterfly member.

In the embodiment of FIGS. 1 to 3 and 7 to 9, the surface 11 of the butterfly member 8 opposed to the planar surface 10 is a convex curved cylindrical surface having generatrices parallel to the axis Y—Y. By way of a modification, as shown in FIGS. 10 and 11, this surface 11a may be recessed in the manner of a trough with generatrices roughly perpendicular to the axis Y—Y, the minimum thickness being just sufficient to allow the passage of the shaft 9 of the butterfly member 8a (FIG. 10). In both cases, the butterfly member has an aero- or hydrodynamic profile in the fully open position at 90° to its closed position and it consequently offers minimum resistance to the flow.

As mentioned before, in the course of rotating the butterfly member 8 toward the closed position, the seal element 13 approaches the seat and encounters it more or less simultaneously throughout the periphery of the butterfly and seat in accordance with the aforementioned choice of the angle x. This encounter occurs with no sliding or friction and solely with a compression or progressive crushing of the seal element against the seat. In the closed position, this crushing of the seal element exists throughout the periphery of the butterfly member and seat and on a single side of the rotary shiaft 9 which is passed around.

Thus the closure of the passage 3 is absolutely hermetic and, in view of the absence of sliding or friction, it is achieved with the minimum of wear of the seal element 13 in the course of the successive operations of the butterfly member. Even in the zone of the axis of rotation Y—Y, the encounter of the seal element 13 with its seat 5 occurs as illustrated in FIGS. 13 and 14 and the crest 15 is gradually crushed against the seat with no sliding or friction as the butterfly member 8 is rotated. In the course of this encounter, each point of the crest 15 encounters a plane tangent to the surface of the seat 5 having at least roughly the same inclination relative to the tangent to the circle of rotation of the considered point of the crest 15.

In the modification of FIG. 18, the butterfly member 8b has the same shape as the butterfly member 8 of FIGS. 1 to 3 and 7 to 9 but is eccentric in that its axis of rotation Z—Z does not intersect the axis X—X but is of course orthogonal to the latter.

More precisely, the neck B of the semi-amphora profile is located on one side of the axis of rotation Z—Z of the rotary shaft 9b which is freely journalled in the body 1b, and the apex 19 of the swell is located on the other side of the flow axis X—X. The butterfly member 8b is keyed on the rotary shaft 9b by means of a pair of lugs 20 which project from the planar surface 10.

The neck and the swell of the profile of the butterfly member 8b are thus distributed relative to the axes X—X and Z—Z and the butterfly member is voluntarily out of balance so that, if the direction of flow is that shown by arrow f, the flow must overcome the tendency of the butterfly member 8b to rotate under the effect of the force of gravity about the axis Z—Z in the direction of arrow g, ie. to constantly return to the closed position, and that, if the direction of the flow is opposed to the arrow f, the butterfly member 8b closes in rotating in the direction of arrow q. Consequently, the butterfly member 8b stops the flow in the direction opposed to the direction of the arrow f and acts as a check-valve.

The geometric condition defining the seal lines 15 and 16 and the seat surface 5 are the same as before and the aforementioned advantages concerning the closing and sealing conditions are also the same, in particular in the zone of the eccentric axis of rotation Z—Z.

It will be observed that, in this modification, the tubular body 1b has no end flanges. This body is adapted to be mounted by clamping it between two flanges of piping which are interconnected by tie-rods in the known manner.

It must be understood that all the foregoing is applicable to the case where the seat is formed on the periphery of the butterfly member and the elastically yieldable seal element is carried by the body of the valve.

Having now described my invention what I claim as new and desire to secure by Letters Patent is:

1. In a butterfly-valve comprising a tubular body which defines a flow passage having a flow axis and a butterfly closure member mounted in said body to rotate about an axis of rotation perpendicular to said flow axis, one of two elements consisting of said body and said closure member carrying an elastically yieldable seal element and the other of said elements carrying a surface providing a seat for said seal element, the seat defining a mean line and the seal element defining a seal line, the seal element being adapted to be crushed against the seat in a completely closed position of said butterfly member after contact between the seal element and the seat with coincidence between the seal line and the mean line throughout the peripheral extent of said lines; the improvement wherein the seal element and the seat each have a closed curved configuration when viewed in a direction parallel to said flow axis with the closure member in the closed position and each have a warped curved configuration when viewed in a direction parallel to said axis of rotation, and, when the seal element is in a position in which it has just encountered the seat without crushing of the seal and the seal line and mean line are coincident, at every point M of the seal line throughout the periphery of the flow passage, a plane T tangent to the seat makes an acute angle x with a tangent t to a circle which has a radius R centered on the intersection O of said flow axis and said axis of rotation Y—Y and passes through the point M, said acute angle being at least substantially constant throughout said periphery.

2. A butterfly-valve according to claim 1, wherein said angle is of the order of 20° to 30°.

3. A butterfly-valve according to claim 1, wherein said mean line defined on said body has, in section in a plane which contains said flow axis and is perpendicular to said axis of rotation and is a plane of symmetry of the butterfly-valve, a profile in the shape of a semi-amphora which has on one side of said flow axis, starting at an end of the semi-amphora, a roughly rectilinear inclined portion corresponding to a foot of the semi-amphora and connected to a portion pertaining to a swell of the semi-amphora, which swell has a rounded and convex apex spaced away from said flow axis and, on another side of said flow axis, a concave portion pertaining to a neck of the semi-amphora.

4. A butterfly-valve according to claim 3, wherein said angle is of the order of 20° to 30°.

5. A butterfly-valve according to claim 3, wherein the semi-amphora has ends which are in alignment with the trace of said axis of rotation in said plane.

6. A butterfly-valve according to claim 4, wherein the semi-amphora has ends which are not in alignment with the trace of said axis of rotation in said plane.

7. A butterfly-valve according to any one of the claims 1 to 6, wherein the seal element is carried by the butterfly member and comprises a projection on a covering of elastomer which covering covers the whole of the butterfly member, said projection having a crest defining said seal line.

8. A butterfly-valve according to any one of the claims 1 to 6, wherein said surface providing the seat is a surface generated by a rectilinear generator.

9. A butterfly-valve according to claim 8, wherein each generatrix of said surface providing the seat is perpendicular to said tangent at the considered point M.

10. A butterfly-valve according to any one of the claims 1 to 6, wherein said angle is exactly constant throughout the periphery of the butterfly member and seat.

11. A butterfly-valve according to any one of the claims 1 to 6, wherein said angle varies throughout the periphery of the butterfly member and seat in an inverse ratio to a radius of displacement of the point travelling along said seal line.

12. A butterfly-valve according to any one of the claims 1 to 6, wherein the butterfly member carries the seal element on the periphery of the butterfly member and has a surface which is of curved convex shape.

13. A butterfly-valve according to claim 12, wherein said curved convex surface is a cylindrical surface having generatrices parallel to said axis of rotation.

14. A butterfly-valve according to any one of the claims 1 to 6, wherein the butterfly member carries the seal element on the periphery of the butterfly member and has a surface which is located within the seal element and is a hollow surface.

15. A butterfly-valve according to claim 14, wherein said hollow surface is a cylindrical surface having generatrices perpendicular to said axis of rotation.

16. A butterfly-valve according to any one of the claims 1 to 6, comprising a shaft which is mounted in said body to rotate about an axis which intersects said flow axis and is for connection to means for driving the shaft in rotation, the butterfly member being keyed on said shaft.

17. A butterfly-valve according to any one of the claims 1 to 6, comprising a shaft which is mounted in said body to rotate about an axis which does not intersect said flow axis, said shaft being freely rotatable in said body and the butterfly member being keyed on said shaft so that the butterfly-valve constitutes a check valve.

18. A butterfly-valve according to any one of the claims 1 to 6, wherein said seat is in an as-cast condition.

19. A butterfly-valve according to claim 1, wherein the seat projects inwardly from the passage and is located on each side of a plane of symmetry P, and the seat surface is a sinuous surface located on each side of the seal line and has a semi-amphora shape.

20. A butterfly-valve according to claim 19, wherein, by a more or less progressive twisting below the axis of rotation on each side of the plane of symmetry, the seat surface changes orientation from one extreme point A most remote from said axis to a diametrically opposite point B in order to obliquely face the direction of flow if it was oriented in the opposite direction, or vice-versa.

21. A butterfly-valve according to claim 19, wherein, at the two ends of the axis of rotation, the seat surface has the same orientation relative to the direction of flow up to an extreme point A most remote from said axis and located adjacent the butterfly member in the open position. thereof.

22. A butterfly-valve according to claim 19, wherein the seat surface remains inclined at an approximately constant angle, even in the zone of the axis of rotation, relative to the tangent at any point M of the seal line to a circle of radius OM which is the path that the point M travels through when the closure member is rotated.

23. A butterfly-valve according to claim 19, wherein the seat and the seal element are located on a single side of said axis of rotation in the closed position of the closure member.

* * * * *